United States Patent [19]

Zeller

[11] Patent Number: 4,671,144
[45] Date of Patent: Jun. 9, 1987

[54] RETAINING CLAMP FOR DISC BRAKE PISTONS

[75] Inventor: Mark F. Zeller, Englewood, N.J.

[73] Assignee: N.T.T. Corporation, Leonia, N.J.

[21] Appl. No.: 832,154

[22] Filed: Feb. 21, 1986

Related U.S. Application Data

[63] Continuation-in-part of Ser. No. 355,471, Mar. 8, 1982, abandoned.

[51] Int. Cl.⁴ .............................................. B25B 5/14
[52] U.S. Cl. .................................... 81/488; 29/281.1; 29/283
[58] Field of Search ................. 188/73.31, 73.32, 382; 81/488; 29/281.1, 283, 233, 150; 269/40

[56] References Cited

U.S. PATENT DOCUMENTS 3,882,972 5/1975 Newstead et al. ............... 188/73.32
4,072,216 2/1978 Haraikawa ....................... 188/73.32

Primary Examiner—Roscoe V. Parker
Attorney, Agent, or Firm—Stefan J. Klauber

[57] ABSTRACT

A tool is provided having a back wall, two spaced bottom walls extending from the bottom end of the back wall and two spaced front walls extending upwardly from the ends of the bottom walls which form a generally "U"-shaped channel that is suitable to be used as a retaining clamp for disc brake pistons during the replacement of the disc brake pads in heavy duty, multiple piston brake systems.

7 Claims, 9 Drawing Figures

RETAINING CLAMP FOR DISC BRAKE PISTONS

This application is a continuation-in-part of application Ser. No. 355,471, filed Mar. 8, 1982 and now abandoned.

FIELD OF THE INVENTION

This invention relates to clamps and holders and, more particularly, to clamps and/or holders suitable for use during the repair and/or maintenance of automobile braking systems.

BACKGROUND OF THE INVENTION

It is well known that the cost of auto repairs have been significantly increasing because of the complexity of automobiles, the cost of replacement parts and the time required to do the repairs. Moreover, automobiles are generally being used for longer periods and driven a greater number of miles before replacement than was heretofore the case, and increasing numbers of automobile owners are finding it useful, or even necessary, to do their own required repair work and routine maintenance. However, while a great deal of such work is within the capability of auto owners having limited skills, special tools are frequently required or would be helpful in avoiding problems that may arise due to lack of experience of the repairman.

For example, most automobiles are fitted with "disc" brakes on at least two of the wheels. Braking of the vehicle results from hydraulically driven caliper pistons being energized by the driver, which act on brake pads to engage a metal disc rotating with the wheels of the vehicle. Due to the severe service experienced by a vehicle's braking system, the attendant wearing of the brake pads require their periodic replacement to maintain the operability thereof and avoid damage to other parts of the brake system. As is known, most brake pads are replaceable, generally as a maintenance item. One conventional procedure that is widely used for that purpose involves the following general steps:

Drain some brake fluid from the master cylinder; the insertion of thicker replacement brake pads will push the caliper pistons back into their bores (hydraulically driven pressure device for applying brake pads against the revolving disc) and cause a full master cylinder to overflow;

raise and support the car and remove the wheels;
        extract and discard the cotter pin found on the inside end of the brake pad retaining pin(s);
    withdraw the retaining pin(s) and remove the worn pads;
    force the caliper pistons into their bores and insert the replacement pads;
    replace the retaining pins and secure them with new cotter pins; and
    refill the master cylinder and bleed the system, if necessary.

These basic steps appear quite simple and routine, and they should be. However, when working with vehicles having heavy-duty braking systems such as two spring-loaded caliper pistons, both pistons must be forced into their bores to remove the worn brake pad and replace it with a thick, new pad. The caliper piston springs are quite strong and the pistons, which are hydraulically operated, have rubber sealing parts which can be easily damaged.

Generally, in such multiple, spring-loaded piston systems, it is difficult, if not impossible, for one person to install new pads without damage to other parts and-/or drawing air into the hydraulic braking system. Two or more separate pistons must be pushed back into their bores and then securely restrained within the bores while the old pad is being removed and a new pad is installed. The old brake pad may be used to push both piston springs back into the caliper bores, but it is necessary to remove the worn pad before a new one can be installed.

Control of the spring-loaded pistons during this phase of the operation is quite important since, for example, extension of the piston due to lack of adequate restraint, will cause air to be drawn into the system, usually past the rubber parts, and collects in areas which are difficult to bleed. Thus, supplemental means for restraint such as provided by another individual with a tool or clamp, are needed to safely install the new pads. An automobile repair shop generally can rely on the availability of several workers, but the automobile owner simply does not have the assistance available to perform what could be a routine maintenance operation.

In accordance with the foregoing, it may be regarded as an object of the present invention to provide a tool for readily replacing the brake pads in vehicle heavy-duty disc brake systems.

A further object of the invention is to provide a tool suitable for use by an individual in the ready replacement of brake pads in automobile multiple, spring-loaded piston disc brake systems.

A still further object of the invention is to provide a tool adapted for use with one hand in the maintenance of automobile disc brake systems having calipers with two spring-loaded pistons, whereby said tool retains both caliper springs while a worn disc brake pad is being removed and a new disc brake pad is being inserted in its place.

SUMMARY OF THE INVENTION

In accordance with the present invention, a tool is provided for use with conventional heavy-duty disc brake systems which is suitable to serve as a clamp for at least two spring-loaded disc brake caliper pistons, enabling the removal of a worn disc brake pad and replacement thereof by a new disc brake pad without damage to any component of a vehicle's disc brake system, and without drawing air into the system.

The tool of the invention includes a back wall, two spaced bottom walls extending laterally from the bottom end of the back wall, and two spaced front walls extending laterally in an upward direction from the opposite ends of the bottom walls, and preferably, to about the same height as the back wall, whereby a generally "U" shaped channel is formed.

Surprisingly, it has been found that the tool of the invention can be readily mounted over the circumferential edge of a disc brake caliper-half housing secured to a vehicle's axle by one individual so that the two spaced front walls of the tool are disposed over the ends of the caliper bores and retain the spring-loaded pistons which have been forced therein. With the piston springs retained within the caliper bores, removal of a worn brake pad and replacement with a new, thicker one can be readily and rapidly achieved. The tool can be readily set in place over the disc brake caliper-half by an individual working alone after, as described above as conventional, the two or more caliper pistons acting on a pad to be replaced, have been forced into their bores; and the tool can be just as easily removed after the new brake pad has been put in place.

The ease with which the tool of the invention can be used by only one individual in servicing heavy-duty multiple piston disc brake systems, not only substantially eliminates possible damage to the brake system, but increases the speed by which brake pads can generally be replaced, and avoids drawing air into the system as frequently occurs using conventional procedures.

DESCRIPTION OF PREFERRED EMBODIMENTS

Figure 1:
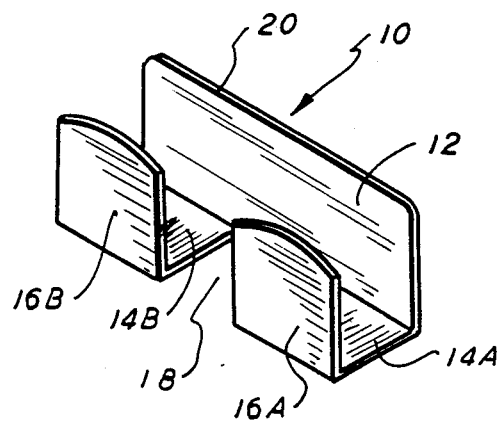
FIG. 1 is a perspective view of a retaining clamp for disc brake pistons in accordance with the present invention.
Figure 2:
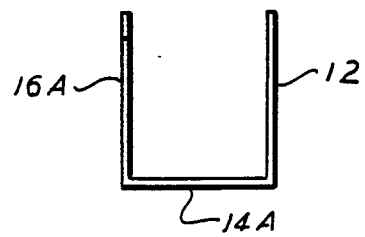
FIG. 2 is an end view of the clamp of FIG. 1.
Figure 3:
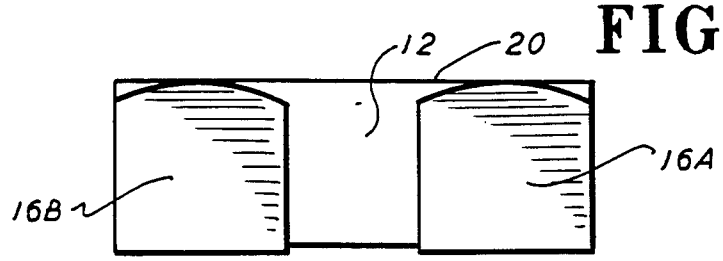
FIG. 3 is a front elevational view of the clamp of FIG. 1.
Figure 4:
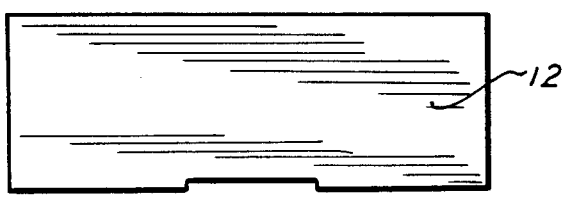
FIG. 4 is a rear elevational view of the clamp of FIG. 1.
Figure 5:
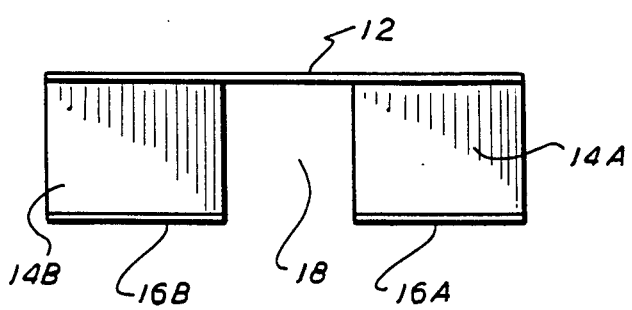
FIG. 5 is a plan view of the clamp of FIG. 1.
Figure 6:
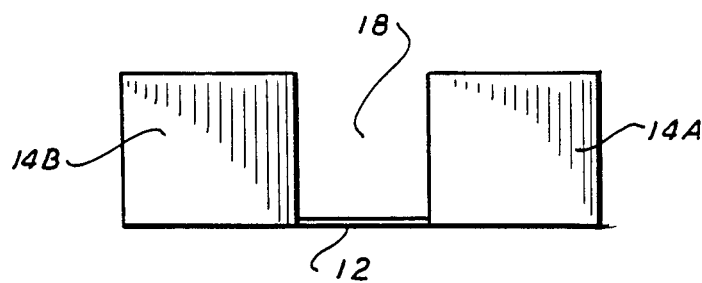
FIG. 6 is a bottom view of the clamp of FIG. 1.

Turning now to the drawing, wherein like reference numerals denote like parts, there is illustrated in FIGS. 1 to 6 a retaining clamp or holder 10 for disc brake pistons constructed in accordance with the principles of the present invention. The retaining clamp 10 includes a back wall 12 and first and second bottom walls 14A and 14B, respectively, extending laterally (about 90°) from the bottom edge of back wall 12 with a space 18 therebetween. First and second front walls or legs 16A and 16B extend laterally upwardly (about 90°) from the ends of walls 14A and 14B, respectively, each of said front walls or legs 16A and 16B extending upwardly, generally to the same height as back wall 12. As illustrated in FIG. 2, the clamp or holder 10 of the invention is in a generally rectangular, open or "U" shaped channel form, wherein the length of each of the walls thereof are of generally similar dimensions. The bottom walls 14A and 14B and front walls 16A and 16B are spaced apart a sufficient distance 18, as more fully discussed hereinafter, to avoid interference with protrusions from the surface of a brake caliper housing and to assure that front walls or legs 16A, 16B will be disposed over the ends of the piston bores in the housing. The front walls or legs 16A, 16B are spaced a sufficient distance from the back wall 12 to provide for the reception of the clamp 10 over the edge of the circumference of a brake caliper housing as hereinafter described.

The clamp 10 can be made from wood, plastic resin, or, preferably, metal by any method generally known in the art.

Figure 7:
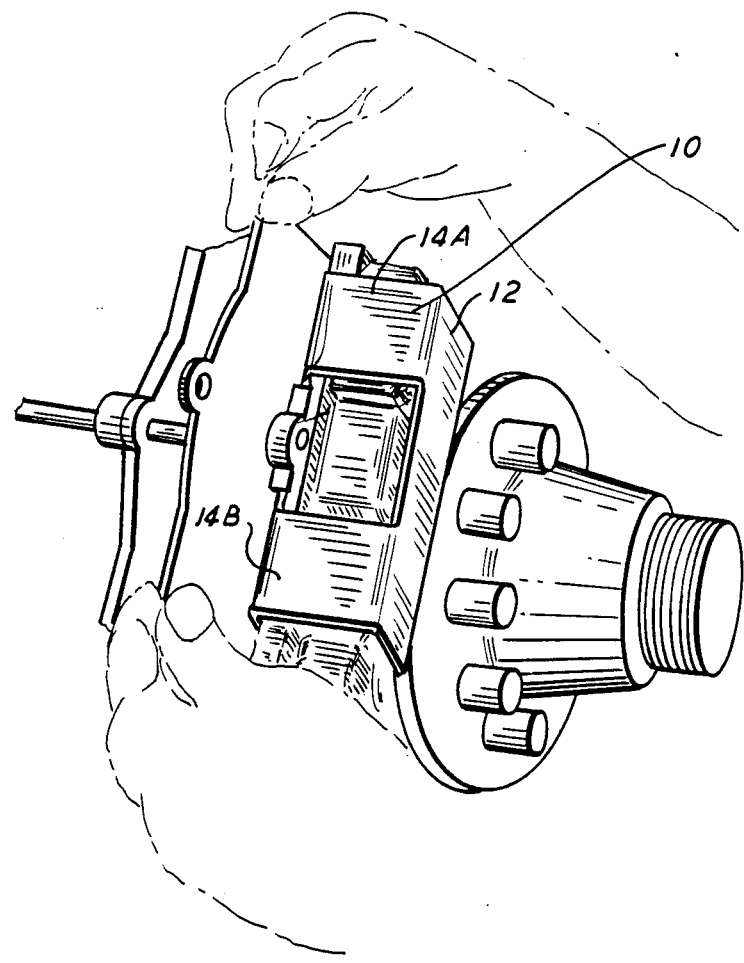
FIG. 7 is a cut-a-way perspective view illustrating the use of the retaining clamp of the invention installed on a disc brake caliper case.

In FIG. 7, a perspective view of a disc brake caliper case mounted on a vehicle axle illustrates the manner in which the clamp or holder 10 of the present invention may be used. In use, the holder 10 is mounted over half of a caliper housing with the back wall 12 of the holder being positioned over the outer wall of the caliper, the lateral walls 14A and 14B being disposed over the top of the circumferential wall of the caliper and front walls 16A and 16B being disposed over the open ends of the two bores in the caliper housing with the caliper pistons (not shown) recessed therein. The space 18 between lateral walls 14A and 14B provides clearance for the holder 10 over "bosses" or other protrusions about the circumference or other sections of a housing, while said lateral walls 14A and 14B assure that the front walls 16A and 16B respectively, are disposed over the open ends of the piston bores and provide support for said front walls to retain springloaded caliper pistons within the bores. As would be evident, the front walls 16A, 16B are spaced from back wall 12, so that the holder 10 can be readily positioned about the caliper housing with one hand, after both caliper pistons acting on the brake pad to be replaced have been forced into their bores in any known manner, such as by action of the worn brake pad. Further, in view of the configuration of the holder 10, of the invention, the holder, surprisingly, will remain securely in place and not be dislodged until the user chooses to remove the same after replacing the worn brake pad.

Since both caliper pistons acting on the worn brake pads are retained by the holder 10 within their bores, the worn pad can be rapidly removed and then replaced with a new one without damage to the rubber parts or other elements of the disc brake system, even though the operation is carried out by one individual. Moreover, since the piston does not become overly extended within its bore during the replacement of the brake pad, air is not drawn into the system, thus eliminating the need to bleed the system. Other aspects of the maintenance job would be carried out in the usual manner after the holder 10 is removed, again by the routine action of the worker. Thus, using the conventional method for replacing disc brake pads in a heavy duty brake system, the holder tool of the present invention enables all the brake pads in the system to be rapidly removed and replaced as a routine maintenance function by one individual.

Many modifications and variations of the holder or clamp of the invention are possible in the light of the teaching herein.

The generally "U" shaped configuration of the holder is an important criteria for all of such variations and it is preferred to have two or more spaced lateral extensions from one back wall providing other walls of the holder, since it enables one clamp or holder to be positioned in a manner that would retain 2 or more spaced caliper pistons. As would be evident, the spacing between the lateral extensions 14A and 14B, and between the front walls 16A, B, and the back wall 12 can vary depending upon the particular size and shape of the caliper housing and disc brake systems being serviced.

Figure 8:
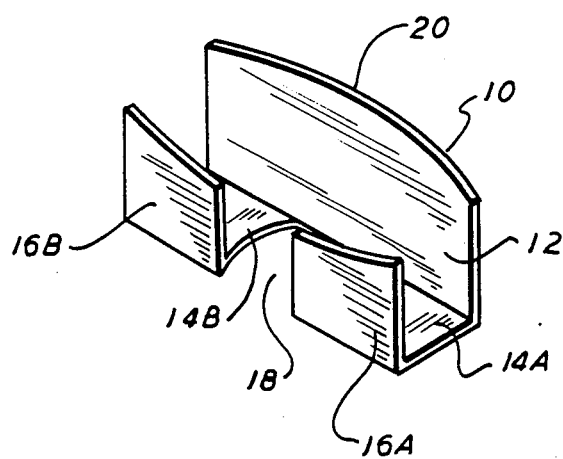
FIG. 8 is a perspective view of an alternate embodiment of a retaining clamp for disc.
Figure 9:
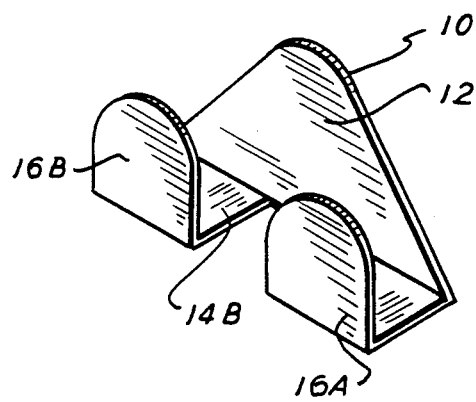
FIG. 9 is a perspective view of a further embodiment of a retaining clamp in accordance with the invention.

In FIGS. 8 to 10 are illustrated alternate embodiments of the clamp or holder according to the invention.

In FIG. 8 is illustrated a holder 10 where the back wall 12 has an arcuate top edge 20, the top edges of front walls 16A and 16B have a concave shape and the edges of lateral extensions 14A, 14B are arcuate, while in FIG. 9 is illustrated a holder 10 where the top edge of the back wall is deeply cut away and the top edges of each of the front walls 16A, 16B are rounded.

From the foregoing, it will be seen that the present invention provides a holder that is capable of being readily used by an individual to rapidly carry out the conventional function of replacing brake pads in heavy duty disc braking systems without the need for any other assistance.

While in the foregoing specification, embodiments of the invention have been set forth in considerable detail for purposes of making a complete disclosure thereof, it will be apparent to those skilled in the art that numerous changes may be made without departing from the spirit and principles of the invention.

What is claimed is:

1. A tool suitable for use with vehicle disc brake systems comprising:

A clamp having a back wall, two spaced bottom walls extending laterally from a bottom end of said back wall and two spaced front walls extending in an upward direction from the ends of the bottom walls to form a generally "U"-shaped channel, whereby said clamp may be positioned over the circumferential edge of a disc brake caliper housing with each of the spaced front walls disposed over an end of a piston bore in said housing to retain a spring-loaded piston within said bore.

2. The tool according to claim 1 wherein said spaced front walls extend in a lateral upward direction from said bottom walls to about the same height of said back wall.

3. The tool according to claim 1 wherein said back wall has a generally rectangular configuration.

4. The tool according to claim 1 wherein the top edge of each of the front walls is arcuate.

5. The tool according to claim 2 wherein the front walls extend upwardly from the bottom walls substantially the same distance as the distance the bottom walls extend from the bottom end of the back wall.

6. The tool according to claim 1 wherein the front walls are spaced from the back wall a sufficient distance to provide for the reception of the clamp over the circumferential edge of a disc brake caliper housing with the clamp being securely retained in place.

7. The process of replacing a brake pad in a disc brake assembly having multiple spring-load pistons disposed in caliper bores, which comprises depressing said pistons in said bores, restraining said pistons in said bores by applying to said assembly a retaining clamp as defined in claim 1, replacing the brake pad while aid restraining clamp is restraining said pistons in said bores, and thereafter removing said clamp.

* * * * *